United States Patent
Tagami et al.

(10) Patent No.: US 8,867,104 B2
(45) Date of Patent: Oct. 21, 2014

(54) IMAGE SCANNING APPARATUS

(71) Applicant: KYOCERA Document Solutions Inc., Osaka (JP)

(72) Inventors: Yuya Tagami, Osaka (JP); Kunihiko Shimamoto, Osaka (JP); Masaki Baba, Osaka (JP)

(73) Assignee: Kyocera Document Solutions Inc. (JP)

( * ) Notice: Subject to any disclaimer, the term of this patent is extended or adjusted under 35 U.S.C. 154(b) by 62 days.

(21) Appl. No.: 13/724,428

(22) Filed: Dec. 21, 2012

(65) Prior Publication Data

US 2013/0169998 A1 Jul. 4, 2013

(30) Foreign Application Priority Data

Dec. 28, 2011 (JP) ................. 2011-287055

(51) Int. Cl.
| | |
|---|---|
| *H04N 1/40* | (2006.01) |
| *H04N 1/00* | (2006.01) |
| *G06K 9/46* | (2006.01) |
| *G06F 13/00* | (2006.01) |
| *H04N 1/32* | (2006.01) |

(52) U.S. Cl.
CPC ....... *H04N 1/00005* (2013.01); *H04N 1/32443* (2013.01); *H04N 2201/3287* (2013.01); *H04N 2201/0081* (2013.01); *H04N 2201/3298* (2013.01)
USPC ........... 358/444; 358/404; 711/100; 711/114; 382/234

(58) Field of Classification Search
None
See application file for complete search history.

(56) References Cited

U.S. PATENT DOCUMENTS

| | | | | |
|---|---|---|---|---|
| 4,591,928 | A * | 5/1986 | Bloom et al. | 360/13 |
| 5,715,329 | A | 2/1998 | Murata | |
| 6,237,079 | B1 * | 5/2001 | Stoney | 712/34 |
| 6,707,463 | B1 * | 3/2004 | Gibson et al. | 345/619 |
| 6,799,246 | B1 * | 9/2004 | Wise et al. | 711/117 |
| 7,366,842 | B1 * | 4/2008 | Acocella et al. | 711/118 |
| 7,548,851 | B1 * | 6/2009 | Lau et al. | 704/201 |
| 7,706,445 | B2 * | 4/2010 | Okada | 375/240.15 |
| 8,396,352 | B2 * | 3/2013 | Boston et al. | 386/295 |
| 8,498,023 | B2 * | 7/2013 | Suzuki | 358/404 |
| 2002/0057446 | A1 * | 5/2002 | Long et al. | 358/1.13 |
| 2002/0181588 | A1 * | 12/2002 | Okada | 375/240.12 |
| 2005/0030585 | A1 * | 2/2005 | Suwa et al. | 358/1.16 |
| 2006/0007199 | A1 * | 1/2006 | Gilbert | 345/204 |
| 2010/0002270 | A1 * | 1/2010 | Suzuki | 358/444 |
| 2011/0173209 | A1 * | 7/2011 | Fortier | 707/747 |
| 2012/0278347 | A1 * | 11/2012 | Foster | 707/758 |

FOREIGN PATENT DOCUMENTS

| | | |
|---|---|---|
| JP | H05-014562 | 1/1993 |
| JP | 2007-174177 | 7/2007 |

* cited by examiner

*Primary Examiner* — Madelein A Nguyen

(57) ABSTRACT

An image scanning apparatus of this disclosure includes: a scanner unit which generates image data by image scanning and outputs it; a memory; a data processing unit which (a1) performs a predetermined process for either the image data outputted by the scanner unit or the image data for which a preprocess has been performed, (a2) writes the processed image data into a predetermined memory area in the memory in turn, and (a3) returns a writing position of the image data to a top of the memory area and overwrite the image data if the writing position of the image data reaches an end of the memory area; and a control unit which (b1) allocates the memory area in the memory and (b2) measures a shortage amount of the memory area on the basis of a size of an area where the image data has been overwritten.

8 Claims, 4 Drawing Sheets

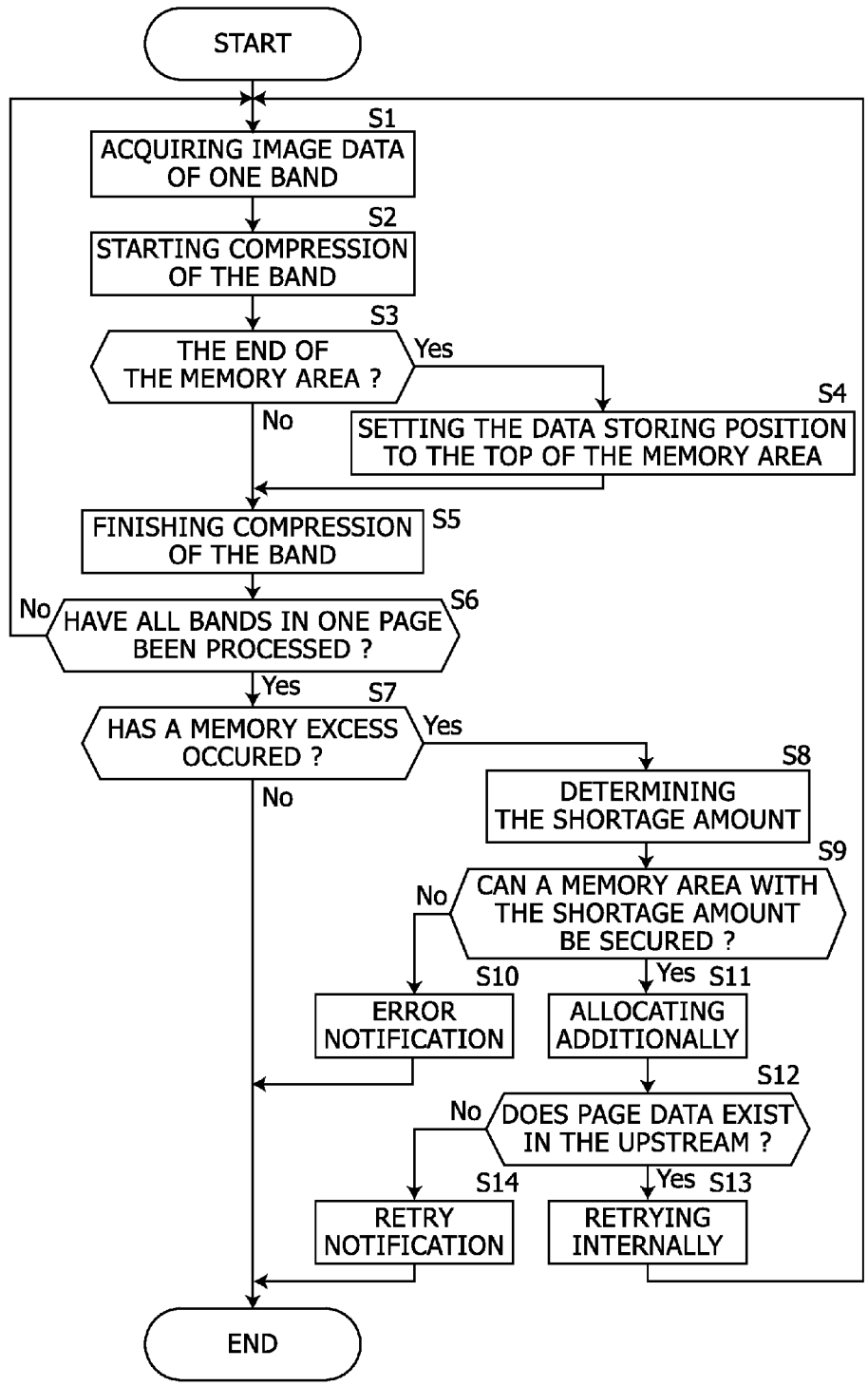

IMAGE SCANNING APPARATUS

CROSS-REFERENCE TO RELATED APPLICATIONS

This application relates to and claims priority rights from a Japanese Patent Application: No. 2011-287055, filed on Dec. 28, 2011 the entire disclosures of which are hereby incorporated by reference herein.

BACKGROUND OF THE INVENTION

1. Field of the Invention

The present invention relates to image scanning apparatuses.

2. Description of the Related Art

An image scanning apparatus optically scans a page image of a document, generates image data of the page image, and performs a predetermined process for the image data. Before, in, or after the process, the image data is temporarily stored in a predetermined memory area.

If the size of the image data is larger than the size of the predetermined memory area, then in general the process is suspended, however, some techniques to continue the process are proposed.

In one of the techniques, if the size of the image data is larger than the size of the memory area, then the compression rate is gained to reduce the size of the image data.

In another one of the techniques, if the size of the image data is larger than the size of the memory area, then the resolution of the image data is lowered to reduce the size of the image data.

SUMMARY OF THE INVENTION

An image scanning apparatus according to an aspect of this disclosure includes: a scanner unit configured to generate image data by image scanning and output the image data; a memory; a data processing unit configured (a1) to perform a predetermined process for either the image data outputted by the scanner unit or the image data for which a preprocess has been performed, (a2) to write the image data for which the predetermined process has been performed into a predetermined memory area in the memory in turn, and (a3) to return a writing position of the image data to a top of the memory area and overwrite the image data if the writing position of the image data reaches an end of the memory area; and a control unit configured (b1) to allocate the memory area in the memory and (b2) to measure a shortage amount of the memory area on the basis of a size of an area where the image data has been overwritten.

Therefore, the shortage amount of the memory area is exactly measured. Even if the size of the image data is larger than the size of the memory area, an additional area with the size of the shortage amount is allocated and the process is retried, and consequently, performing the process does not result in poor image quality.

These and other objects, features and advantages of the present invention will become more apparent upon reading of the following detailed description along with the accompanied drawings.

BRIEF DESCRIPTION OF THE DRAWINGS

FIG. 3 shows a flowchart which explains a compression process performed in the image scanning apparatus shown in FIG. 1.

DETAILED DESCRIPTION

Hereinafter, an embodiment according to aspects of the present disclosure will be explained with reference to drawings.

Figure 1:
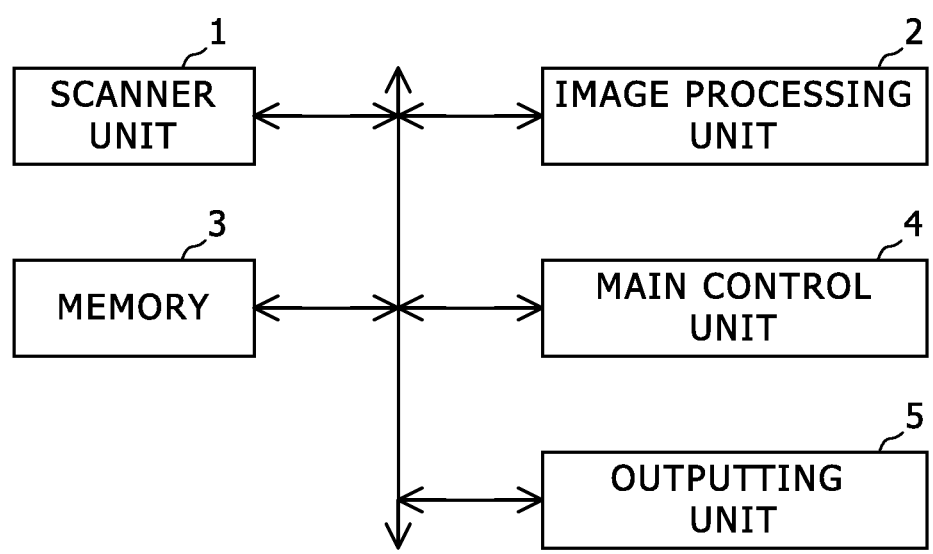
FIG. 1 shows a block diagram which indicates a configuration of an image scanning apparatus according to an embodiment of the present disclosure.

FIG. 1 shows a block diagram which indicates a configuration of an image scanning apparatus according to an embodiment of the present disclosure. The image scanning apparatus shown in FIG. 1 includes a scanner unit 1, an image processing unit 2, a memory 3, a main control unit 4, and an outputting unit 5, which are connected to each other.

The scanner unit 1 generates image data by image scanning and outputs the image data.

The image processing unit 2 performs a predetermined process for the image data. The image processing unit 2 performs the predetermined process for either the image data outputted by the scanner unit or the image data for which a preprocess has been performed. The image processing unit 2 writes the image data for which the predetermined process has been performed into a predetermined memory area in the memory 3 in turn, and returns a writing position of the image data to the top of the memory area and overwrites the image data if the writing position of the image data reaches the end of the memory area. For instance, the image processing unit 2 is formed of one or more ASICs (Application Specific Integrated Circuits).

The memory 3 is a volatile memory such as DRAM (Dynamic Random Access Memory). In the memory 3, a memory area is allocated when it is required for a process to be performed by the image processing unit 2.

Figure 2:
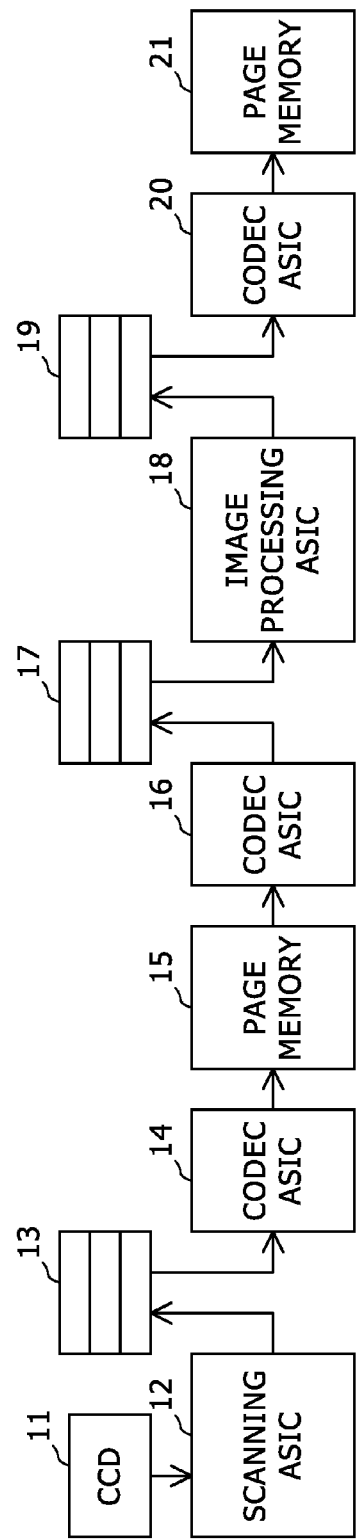
FIG. 2 shows a block diagram which indicates memory areas and a data flow in the image scanning apparatus shown in FIG. 1.

FIG. 2 shows a block diagram which indicates memory areas and a data flow in the image scanning apparatus shown in FIG. 2.

In FIG. 2, a CCD (Charge Coupled Device) 11 is an imaging element which outputs the page image obtained optically as an electronic signal. A scanning ASIC 12 is a circuit which converts the electronic signal from the CCD 11 to image data and outputs the image data. The CCD 11 and the scanning ASIC 12 are included in the scanner unit 1.

A work memory area 13 is allocated in the memory 3, and used as an output buffer of the scanning ASIC 12 and input buffer of a codec ASIC 14.

Codec ASICs 14 and 20 are circuits which perform compression of the image data. For instance, the codec ASIC 14 and 20 performs compression of the image data in a compression method such as JPEG (Joint Photographic Experts Group).

A primary page memory area 15 is allocated in the memory 3, and is a memory area to store the image data generated by the scanning ASIC 12 (compressed image data), that is, the image data (compressed image data) for which an image processing ASIC 18 has not performed image processing yet. In other words, the primary page memory area 15 is used in a subsequent part (downstream) from the work memory area 13, and is an area into which the codec ASIC 14 writes the processed image data.

A codec ASIC 16 decompresses the compressed image data in a decompression method corresponding to the compression method of the codec ASIC 14.

A work memory area 17 is allocated in the memory 3, and used as an output buffer of the codec ASIC 16 and input buffer of the image processing ASIC 18.

The image processing ASIC 18 is a circuit which performs a predetermined image processing for the image data, such as resolution conversion, rotation, and/or data format conversion.

A work memory area 19 is allocated in the memory 3, and used as an output buffer of the image processing ASIC 18 and input buffer of the codec ASIC 20.

A secondary page memory area 21 is allocated in the memory 3, and is a memory area to store the image data (compressed image data) for which the image processing ASIC has performed image processing. In other words, the secondary page memory area 21 is used in the subsequent part (down stream) from the work memory area 19, and is an area into which the codec ASIC 20 writes the processed image data.

The codec ASICs 14, 16, and 20 and the image processing ASIC 18 are included in the image processing unit 2.

As shown in FIG. 2, the image data outputted from the scanning ASIC 12 is provided to the codec ASIC 14 through the work memory area 13, and the image data compressed by the codec ASIC 14 is written into the primary page memory area 15 band by band in turn. One band consists of a predetermined number of lines. The codec ASIC 16 reads out the compressed image data in turn from the primary page memory area 15, decompresses it, and provides the decompressed image data to the image processing ASIC 18 through the work memory area 17. The image data processed by the image processing ASIC 18 is provided to the codec ASIC through the work memory area 19, and the image data compressed by the codec ASIC 20 is written into the secondary page memory area 21 in turn.

Return to FIG. 1, the main control unit 4 controls the scanner unit 1, the image processing unit 2, the memory 3, and the outputting unit 5. Further, the main control unit 4 allocates memory areas (here, the primary page memory area 15 and the secondary page memory area 21) in the memory 3 when the memory areas are required by the image processing unit 2. Regarding each of the primary page memory area 15 and the secondary page memory area 21, if the size of the image data of one page is larger than the size of the memory area 15 or 21, the main control unit 4 measures the shortage amount of the memory area 15 or 21 on the basis of the size of an area where the image data has been overwritten by the image processing unit 2 as mentioned. Further, the main control unit 4 secures an additional area with a size of at least the shortage amount and adds the additional area to the memory area 15 or 21, and causes the image processing unit 2 to perform the predetermined process again after the additional area is added to the memory 15 or 21.

In this embodiment, the main control unit 4 secures a part or all of an area that has been allocated for the aforementioned another purpose as the additional area. Further, the main control unit 4 releases the additional area at the end of a job of the image scanning and returns the additional area to the original area that has been allocated for another purpose.

For example, the main control unit 4 reduces a size of a work memory area (e.g. the work memory area 13, 17, or 19) used for either a double buffer or a ring buffer, and secures an area obtained by the reduction of the work memory area as the additional area.

Further, for example, the main control unit 4 reduces a size of a sort memory area used for sorting plural pages of the image data, and secures an area obtained by the reduction of the sort memory area as the additional area.

Furthermore, for example, the main control unit 4 reduces a size of a reserved memory area for multiple jobs, and secures an area obtained by the reduction of the reserved memory area as the additional area.

The outputting unit 5 outputs the image data for which the image processing unit 2 has performed image processing.

In the following part, a behavior of the aforementioned image scanning apparatus (mainly, the image processing unit 2 and the main control unit 4) is explained.

Here, a compression process by the codec ASICs 14 and writing the compressed image data into the page memory areas 15 and 21 are explained. FIG. 3 shows a flowchart which explains a compression process performed in the image scanning apparatus shown in FIG. 1. FIGS. 4A to 4D show diagrams which explains a measurement of a shortage amount of the memory area in the image scanning apparatus shown in FIG. 1.

The main control unit 4 allocates the work memory area 13, and sets its address information (i.e. the top address and the size, or the top address and the end address) to the scanning ASIC 12 and the codec ASIC 14. In the same manner, the main control unit 4 allocates the primary page memory area 15, and sets its address information (i.e. the top address and the size, or the top address and the end address) to the codec ASICs 14 and 16. In the same manner, the main control unit 4 allocates the work memory area 17, and sets its address information (i.e. the top address and the size, or the top address and the end address) to the codec ASIC 16 and the image processing ASIC 18. In the same manner, the main control unit 4 allocates the work memory area 19, and sets its address information (i.e. the top address and the size, or the top address and the end address) to the image processing ASIC 18 and the codec ASIC 20. In the same manner, the main control unit 4 allocates the secondary page memory area 21, and sets its address information (i.e. the top address and the size, or the top address and the end address) to the image processing ASIC 18.

Firstly, the compression process by the codec ASIC 14 is explained.

Figure 4A:
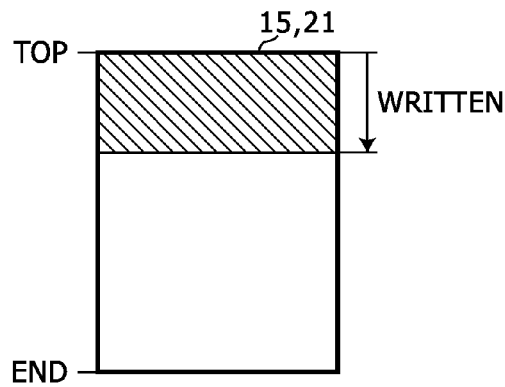
FIGS. 4A to 4D show diagrams which explains a measurement of a shortage amount of the memory area in the image scanning apparatus shown in FIG. 1.
Figure 4B:
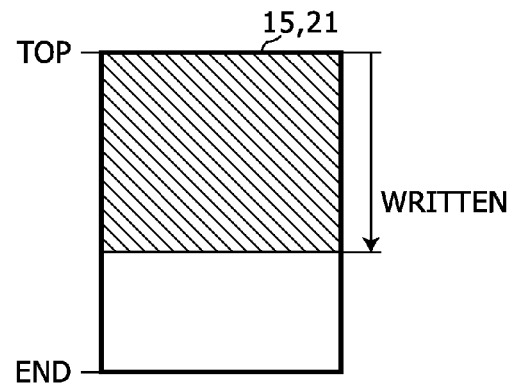
Figure 4C:
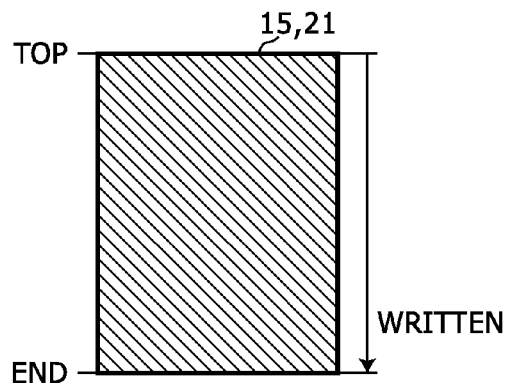
Figure 4D:
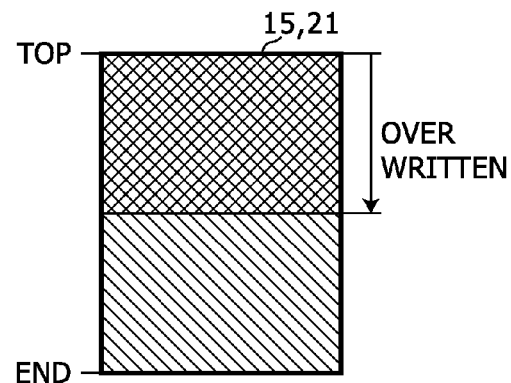

The codec ASIC 14 reads out the image data of one band from the work memory area 13 and compresses it, and writes the compressed image data of one band into the primary page memory area 15 (Steps S1 and S2). As shown in FIGS. 4A and 4B, the writing position of the image data is moved from the top address of the primary page memory area 15 in turn. The codec ASIC 14 monitors whether or not the writing position of the image data reaches the end address of the primary page memory area 15 (Step S3), and returns the writing position to the top address of the primary page memory area if the writing position reaches the end address of the primary page memory area 15 before finishing writing the compressed image data of one band (the status shown in FIG. 4C) (Step S4). It should be noted that the size of the image data of one band before compression is constant, but the size of the compressed image data of one band is not constant. The compress image data of each band is written continuously next to the image data of the previous band without any gaps.

The top position and the end position (alternatively, the size) of the compressed image data of each band are managed by the main control unit 4. When the compressed image data of each band is read out from the primary page memory area 15, the reading position of the compressed image data of each band is determined on the basis of the top position and the end position (alternatively, the size) which the main control unit 4 manages.

When writing the compressed image data of one band is finished (Step S5), the codec ASIC 14 determines whether all bands in one page have been processed or not (Step S6), and if all bands in one page have not been processed, then the codec ASIC 14 returns to Step S1 and processes the next band in the same manner.

As mentioned, the compression process is performed for the image data of one page.

After the compression of the image data of one page, the main control unit 4 determines whether a memory excess has occurred on the primary page memory area 15 (Step S7).

For example, the codec ASIC 14 sets a predetermined flag when the writing position of the image data reaches the end address of the primary page memory area 15, and the main control unit 4 determines whether a memory excess has occurred on the primary page memory area 15 or not according to whether the flag has been set or not.

If the memory excess has not occurred, then the main control unit 4 terminates this compression process.

Otherwise, if the memory excess has occurred, then the main control unit 4 determines a shortage amount of the primary page memory area 15 on the basis of the last writing position of the image data (i.e. the amount of overwritten data) (Step S8).

The main control unit 4 determines whether or not an area with the size of the determined shortage amount can be secured in an area which has been allocated for aforementioned another purpose (Step S9).

If an area with the size of the determined shortage amount can not be secured in an area which has been allocated for aforementioned another purpose, then the main control unit 4 performs an error notification (Step S10) and terminates this compression process. For instance, the main control unit 4 causes an unshown operation panel to display an error message as the error notification.

If an area with the size of the determined shortage amount can be secured in an area which has been allocated for aforementioned another purpose, then the main control unit 4 secures the area with the size of the shortage amount, and adds the secured area to the primary page memory area 15 (Step S11).

In case of the codec ASIC 14, since there are not any page memory areas in upstream in the prior part (upstream) from the codec ASIC 14, the main control unit 4 determines that the image data of the page before the compression does not remain (Step S12), and the main control unit 4 performs a retry notification (Step S14) and terminates this compression process. For instance, the main control unit 4 causes an unshown operation panel to display a message as the retry notification to prompt a user to retry an operation for image scanning. Consequently, the user retries an operation for image scanning, and upon the operation, the scanner unit 1 performs image scanning again.

Secondly, the compression process by the codec ASIC 20 is explained.

The codec ASIC 20 reads out the image data of one band from the work memory area 19 and compresses it, and writes the compressed image data of one band into the secondary page memory area 21 (Steps S1 and S2). As shown in FIGS. 4A *and* 4B, the writing position of the image data is moved from the top address of the secondary page memory area 21 in turn. The codec ASIC 20 monitors whether or not the writing position of the image data reaches the end address of the secondary page memory area 21 (Step S3), and returns the writing position to the top address of the secondary page memory area 21 if the writing position reaches the end address of the secondary page memory area 21 before finishing writing the compressed image data of one band (the status shown in FIG. 4C) (Step S4). It should be noted that the size of the image data of one band before compression is constant, but the size of the compressed image data of one band is not constant. The compress image data of each band is written continuously next to the image data of the previous band without any gaps. The top position and the end position (alternatively, the size) of the compressed image data of each band are managed by the main control unit 4. When the compressed image data of each band is read out from the secondary page memory area 21, the reading position of the compressed image data of each band is determined on the basis of the top position and the end position (alternatively, the size) which the main control unit 4 manages.

When writing the compressed image data of one band is finished (Step S5), the codec ASIC 20 determines whether all bands in one page have been processed or not (Step S6), and if all bands in one page have not been processed, then the codec ASIC 14 returns to Step S1 and processes the next band in the same manner.

As mentioned, the compression process is performed for the image data of one page.

After the compression of the image data of one page, the main control unit 4 determines whether a memory excess has occurred on the secondary page memory area 21 (Step S7).

For example, the codec ASIC 20 sets a predetermined flag when the writing position of the image data reaches the end address of the secondary page memory area 21, and the main control unit 4 determines whether a memory excess has occurred on the secondary page memory area 21 or not according to whether the flag has been set or not.

If the memory excess has not occurred, then the main control unit 4 terminates this compression process.

Otherwise, if the memory excess has occurred, then the main control unit 4 determines a shortage amount of the secondary page memory area 21 on the basis of the last writing position of the image data (i.e. the amount of overwritten data) (Step S8).

The main control unit 4 determines whether or not an area with the size of the determined shortage amount can be secured in an area which has been allocated for aforementioned another purpose (Step S9).

If an area with the size of the determined shortage amount can not be secured in an area which has been allocated for aforementioned another purpose, then the main control unit 4 performs an error notification (Step S10) and terminates this compression process. For instance, the main control unit 4 causes an unshown operation panel to display an error message as the error notification.

If an area with the size of the determined shortage amount can be secured in an area which has been allocated for aforementioned another purpose, then the main control unit 4 secures the area with the size of the shortage amount, and adds the secured area to the secondary page memory area (Step S11).

In case of the codec ASIC 20, since there is a page memory area in upstream in the prior part (upstream) from the codec ASIC 20, the main control unit 4 determines that the image data of the page before the compression remains (Step S12), and the main control unit 4 performs an internal retry (i.e. automatic retry) (Step S13) and performs the compression process. For the internal retry, the main control unit 4 causes the codec ASIC 16 and the image processing ASIC 18 to operate again, and provides the image data to the codec ASIC 20 again, and causes the codec ASIC 20 to perform the same process from Step S1.

In the aforementioned embodiment, the image processing unit 2 (a1) performs a predetermined process for either the image data outputted by the scanner unit or the image data for which a preprocess has been performed, (a2) writes the image data for which the predetermined process has been performed into the predetermined memory area 15 or 21 in the memory 3 in turn, and (a3) returns the writing position of the image data to the top of the memory area 15 or 21 and overwrites the image data if the writing position of the image data reaches the end of the memory area 15 or 21. Further, the main control unit (b1) allocates the memory area 15 or 21 in the memory 3 and (b2) measures a shortage amount of the memory area 15 or 21 on the basis of the size of an area where the image data has been overwritten.

Therefore, the shortage amount of the memory area is exactly measured. Even if the size of the image data is larger than the size of the memory area 15 or 21, an additional area with the size of the shortage amount is allocated and the process is retried, and consequently, performing the process does not result in poor image quality. In other words, even if the memory area 15 or 21 is not enough for the compression process, the compression process is retried without changing the compression rate, and therefore, performing the compression process does not result in poor image quality.

The description of the present invention has been presented for purposes of illustration and description, and is not intended to be exhaustive or limited to the invention in the form disclosed.

For example, in the aforementioned embodiment, a compression process is performed in the previous stage of the page memory area 15 or 21. Alternatively, another type of a process may be performed in the previous stage of the page memory area 15 or 21.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image scanning apparatus, comprising:
a scanner unit configured to generate image data by image scanning and output the image data;
a memory;
a data processing unit configured (a1) to perform a predetermined process for either the image data outputted by the scanner unit or the image data for which a preprocess has been performed, (a2) to write the image data for which the predetermined process has been performed into a predetermined memory area in the memory in turn, and (a3) to return a writing position of the image data to a top of the memory area and overwrite the image data if the writing position of the image data reaches an end of the memory area; wherein the predetermined process comprises compressing the image data band by band and the amount of memory needed to store the compressed image data can vary as between each band;
a control unit configured (b1) to allocate the memory area in the memory, (b2) to measure a shortage amount of the memory area based on a size of an area where the image data has been overwritten for image data corresponding to one page; and (b3) to reallocate the memory area in the memory to a larger size to include the size of the shortage amount and cause the data processing unit to repeat the predetermined process for the image data.

2. The image scanning apparatus according to claim 1, wherein: the control unit is further configured to secure a part or all of an area that has been allocated for another purpose for the memory of the larger size.

3. The image scanning apparatus according to claim 2, wherein:
the control unit is further configured to reduce a size of a work memory area used for either a double buffer or a ring buffer, and to secure an area obtained by the reduction of the work memory area for the memory of the larger size a.

4. The image scanning apparatus according to claim 2, wherein:
the control unit is further configured to reduce a size of a sort memory area used for sorting plural pages of the image data, and to secure an area obtained by the reduction of the sort memory area for the memory of the larger size.

5. The image scanning apparatus according to claim 2, wherein:
the control unit is further configured to reduce a size of a reserved memory area for multiple jobs, and to secure an area obtained by the reduction of the reserved memory area for the memory of the larger size.

6. The image scanning apparatus according to claim 2, wherein:
the control unit is further configured to reduce the memory of larger size at an end of a job of the image scanning and return the area that has been allocated for another purpose.

7. The image scanning apparatus according to claim 1, wherein:
the scanner unit is further configured to generate the image data by performing the image scanning again and output the image data for performing the predetermined process again, if the image data for which the predetermined process has not been performed is not stored currently in another memory area of the memory.

8. The image scanning apparatus according to claim 1, wherein:
the data processing unit is further configured to perform a compression process for the image data, and to write the image data for which the compression process has been performed into the memory area.

\* \* \* \* \*